(12) United States Patent
Chuang et al.

(10) Patent No.: US 10,935,875 B2
(45) Date of Patent: Mar. 2, 2021

(54) PROJECTOR WITH A DUST RESISTANCE CAPABILITY FOR LONG TERM OPERATIONS

(71) Applicant: QISDA CORPORATION, Taoyuan (TW)

(72) Inventors: Jen-Te Chuang, Taoyuan (TW); Wei-Chun Chang, New Taipei (TW)

(73) Assignee: Qisda Corporation, Taoyuan (TW)

( * ) Notice: Subject to any disclaimer, the term of this patent is extended or adjusted under 35 U.S.C. 154(b) by 26 days.

(21) Appl. No.: 16/554,633

(22) Filed: Aug. 29, 2019

(65) Prior Publication Data

US 2020/0089089 A1 Mar. 19, 2020

(30) Foreign Application Priority Data

Sep. 17, 2018 (CN) .......................... 201811083727.5

(51) Int. Cl.
*G03B 21/14* (2006.01)
*G03B 21/00* (2006.01)
*H04N 9/31* (2006.01)
*G02B 27/00* (2006.01)

(52) U.S. Cl.
CPC ........... *G03B 21/145* (2013.01); *G02B 27/00* (2013.01); *G03B 21/008* (2013.01); *G03B 21/14* (2013.01); *H04N 9/31* (2013.01)

(58) Field of Classification Search
CPC .... G03B 21/145; G03B 21/008; G03B 21/14; G02B 26/008; G02B 27/00; H04N 9/31
See application file for complete search history.

(56) References Cited

U.S. PATENT DOCUMENTS

| 4,219,737 | A | 8/1980 | Gagnon | |
|---|---|---|---|---|
| 7,088,321 | B1 * | 8/2006 | Parker | G09G 3/3406 345/211 |
| 2003/0227677 | A1 * | 12/2003 | Doherty | G09G 3/342 359/449 |
| 2007/0139619 | A1 * | 6/2007 | DeCusatis | H04N 13/398 353/7 |
| 2007/0171389 | A1 * | 7/2007 | Li | G03B 21/16 353/122 |

(Continued)

FOREIGN PATENT DOCUMENTS

CN 103123435 A 5/2013
JP 2007195373 A * 8/2007 ............. G03B 21/14

*Primary Examiner* — Michelle M Iacoletti
*Assistant Examiner* — Magda Cruz

(57) ABSTRACT

A projector includes a light source, a color wheel, a housing, a motor, a lens module, an optical detection module, and a feedback module. The light source is used for providing a light beam. The color wheel includes a plurality of optical filtering segments for generating light with a plurality of colors. The housing is connected to the color wheel. The housing has a timing mark. The motor is connected to the housing for rotating the color wheel through the housing. The lens module is used for outputting the light with the plurality of colors. When the housing is rotated, the optical detection module generates a pulse width modulation signal according variations of gray levels of the housing. The feedback module is coupled to the optical detection module for conditionally outputting an adjusted voltage to the optical detection module according to the pulse width modulation signal.

11 Claims, 3 Drawing Sheets

(56) References Cited

U.S. PATENT DOCUMENTS

2009/0033922 A1\* 2/2009 Lin ..................... G02B 26/008
  356/139.09
2010/0295466 A1\* 11/2010 Katakame .............. H05B 45/37
  315/291
2017/0045382 A1\* 2/2017 Chang ....................... G01P 3/36

\* cited by examiner

PROJECTOR WITH A DUST RESISTANCE CAPABILITY FOR LONG TERM OPERATIONS

BACKGROUND OF THE INVENTION

1. Field of the Invention

The present invention illustrates a projector, and more particularly, a projector with a dust resistance capability for long term operations.

2. Description of the Prior Art

With rapid advancements of technologies, various display or projection technologies are widely developed in recent years. Projection devices with high resolution and high mobility are popularly adopted in our daily life. The projection technologies can provide more display applications than general screen-based display technologies, such as space art applications, augmented reality applications, and blind spot reduction applications. Nowadays, projections can be classified into digital light processing (DLP) projectors, 3HTPS liquid crystal display (3LCD) projectors, and liquid crystal on silicon (LCOS) projectors. The 3LCD projector uses three color segments for projecting images. Therefore, the 3LCD projector can project images with stable color tones when a light control process is performed. The 3LCD projector can project the images with high color saturation. The LCOS projector integrates semiconductor process technologies and liquid crystal process technologies. Thus, the LCOS projector can project images with very high quality, such as providing ultra-high definition (UHD, 4K resolution) images. The LCOS projector can provide high color contrast, accurate brightness, high optical efficiency, and high resolution images. The DLP projector can provide high resolution images, has a small size, and has enclosed light paths. The DLP projector can also project images with high color contrast and satisfactory sharpness. Further, the DLP projector is inexpensive. Therefore, the DLP projector is broadly used for various display applications in recent years.

For conventional DLP projectors, a light beam generated by a light source can be emitted to a color wheel with a plurality of optical filtering segments through a cluster lens or a light pipe. After the light beam passes through the color wheel, the color wheel can emit light with a plurality of colors to the digital micro-mirror device (DMD) for generating images. Then, a lens can be used for projecting images on a screen. As a result, the screen can display the images with various colors projected by the DLP projector. However, since the color wheel includes the plurality of optical filtering segments, the color wheel must be rotated by using a motor so that all optical filtering segments can be used for alternately separating colors of the light beam. When the projector is operating in a dusty environment, the dust may continuously drop inside a body of the projector. Therefore, the projector can use various detection methods for detecting and estimating a severity of the dust. When a lot of dust is detected inside the body of the projector, the projector can temporarily shut down. For example, when a lot of dust is detected inside the body of the DLP projector, the DLP projector can cease rotating the color wheel and turn off all projection functions.

SUMMARY OF THE INVENTION

In an embodiment of the present invention, a projector is disclosed. The projector comprises a light source, a color wheel, a housing, a motor, a lens module, an optical detection module, and a feedback module. The light source is configured to emit a light beam. The color wheel comprises a plurality of optical filtering segments for generating light with a plurality of colors when the light beam passes through the plurality of optical filtering segments. The housing is connected to the color wheel and has a timing mark. The timing mark has a first gray level. An area of the housing outside the timing mark has a second gray level. The motor is connected to the housing and configured to rotate the color wheel through the housing. The lens module is configured to output the light with the plurality of colors. The optical detection module faces the housing and is configured to receive a first driving voltage for generating a first pulse width modulation signal according to the first gray level and the second gray level alternatively displayed on a detecting region when the housing is rotated. The feedback module is coupled to the optical detection module and configured to conditionally output an adjusted voltage to the optical detection module according to the first pulse width modulation signal. The first gray level is smaller than the second gray level.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
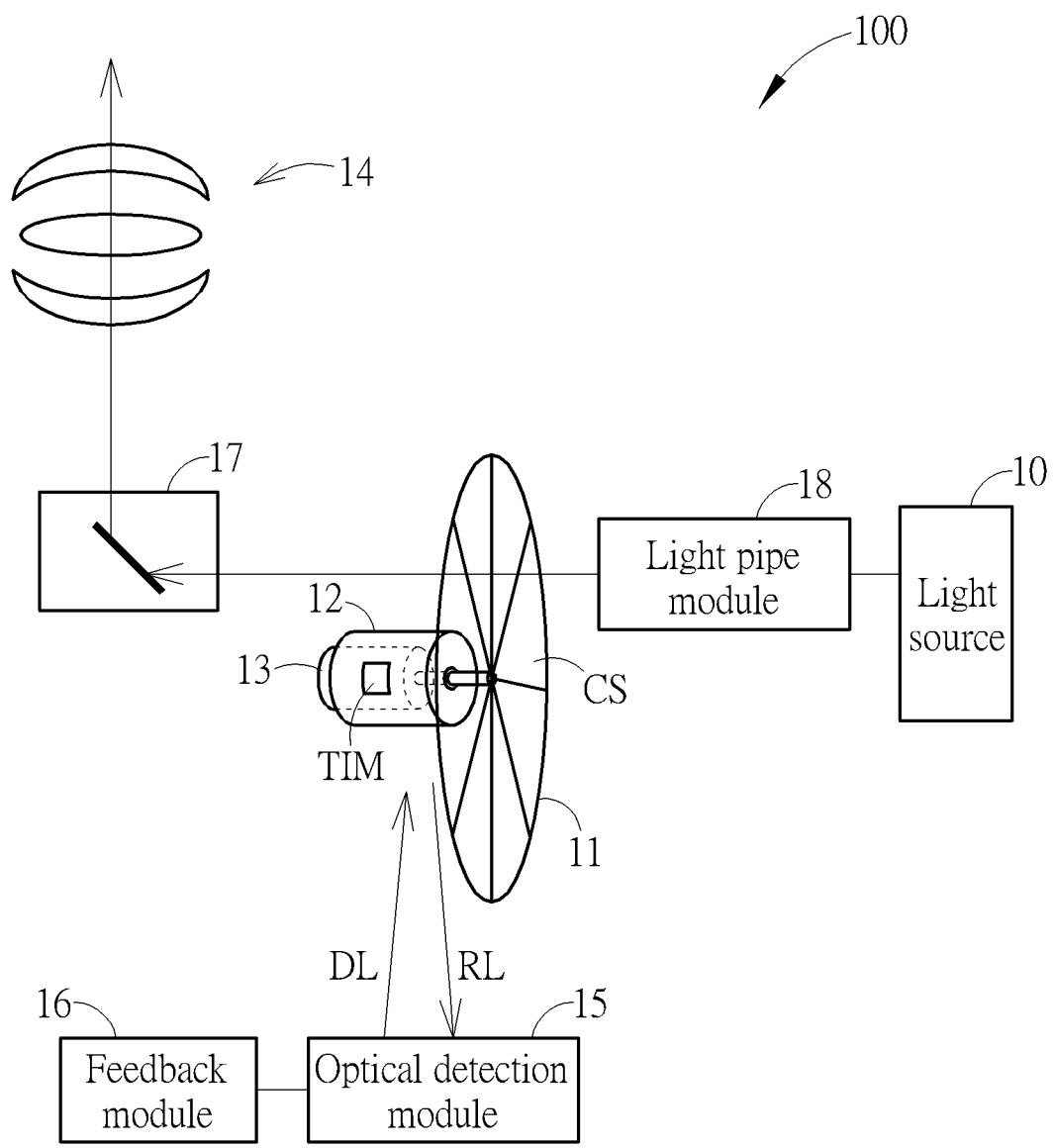
FIG. 1 is a structure of a projector according to an embodiment of the present invention.

FIG. 1 is a structure of a projector 100 according to an embodiment of the present invention. The projector 100 can be a digital light processing (DLP) projector. However, the projector 100 can be any type of projectors. Any reasonable hardware or technology modification of the projector 100 for enhancing a dust resistance capability falls into the scope of the present invention. The projector 100 includes a light source 10, a color wheel 11, a housing 12, a motor 13, a lens module 14, an optical detection module 15, and a feedback module 16. The light source 10 is used for emitting a light beam. The light source 10 can be a high-brightness halogen lamp, a light-emitting diode (LED), or any device capable of emitting the light beam. The color wheel 11 can include a plurality of optical filtering segments CS for generating light with a plurality of colors when the light beam passes through the plurality of optical filtering segments CS. Here, the plurality of optical filtering segments CS can correspond to different colors and can be allocated on interleaved positions. Therefore, when the color wheel 11 is rotated, the light beam generated by the light source 10 can pass through the plurality of optical filtering segments CS with different colors in a short time. Then, the light beam can be converted to the light with the plurality of colors. In other words, the plurality of optical filtering segments CS of the color wheel 11 can be used for alternately separating colors of the light beam. Further, three-primary colors (RGB) of the optical filtering segments CS of the color wheel 11 may also have a slight white balance shift since the three-primary colors of the optical filtering segments CS are designed for matching a color spectrum of the light source 10. A purpose of the slight white balance shift of the optical filtering segments CS is to enhance color tone accuracy of the light outputted from the optical filtering segments CS. The housing 12 is connected to the color wheel 11. The housing 12 has a timing mark TIM. The timing mark TIM has a first gray level. An area of the housing 12 outside the timing mark TIM has a second gray level. The first gray level is smaller than the second gray level. The timing mark TIM can be attached to a surface of the housing 12 by using an adhesion process, an etching process, or a coating process.

In other words, a certain area of the housing 12 includes the timing mark TIM with a high light absorption rate. Therefore, the first gray level of the timing mark TIM is small, leading to a dark color tone. Further, the second gray level of the area of the housing 12 outside the timing mark TIM is large, leading to a light color tone. The motor 13 is connected to the housing 12 for rotating the color wheel 11 through the housing 12. Here, the motor 13 can include a rotary bearing. The rotary bearing can be connected to the housing 12 for rotating the color wheel 11. The housing 12 can be used for covering the motor 13. The housing 12 can also be integrated with the motor 13. Any reasonable hardware modification falls into the scope of the present invention. The lens module 14 is used for outputting the light with the plurality of colors. The lens module 14 can be regarded as an optical output system formed by a plurality of lens layers for outputting the light with the plurality of colors. Then, the light with the plurality of colors can be projected on an image plane (i.e., a screen) with a predetermined focal length. The optical detection module 15 faces the housing 12 for receiving a first driving voltage. Further, when the housing 12 is rotated, the optical detection module 15 can generate a first pulse width modulation signal by detecting the first gray level and the second gray level alternatively displayed on a detecting region. The optical detection module 15 can include a light-emitting device (i.e., such as a light-emitting diode 15b in FIG. 2) and a light-receiving device (i.e., such as a phototransistor 15c in FIG. 2). The light-emitting device emits a detection light signal DL to the housing 12. When the housing 12 is rotated, since the timing mark TIM is alternately displayed on the detecting region along an incident direction of the detection light signal DL, the detection light signal DL can be reflected from the rotating housing 12 with alternate gray levels. Therefore, when the housing 12 is rotated, the housing 12 can reflect the detection light signal DL and generate a reflected light signal RL with varied intensity over time. Particularly, when a rotating rate of the housing 12 is fixed, an intensity variation of the reflected light signal RL is periodic. A time length of a period is approximately equal to a time length of rotating one revolution of the housing 12. However, the detection light signal DL and the reflected light signal RL of the projector 100 are not limited to two visible light signals. For example, the detection light signal DL and the reflected light signal RL can be invisible light signals, such as infrared rays. Further, an amount of the timing mark TIM is not limited to one. When two symmetric timing marks TIM are disposed on two semicircular surfaces of the housing 12, a time length of an intensity variation period of the reflected light signal RL is approximately equal to a time length of rotating half a revolution of the housing 12. Any technology modification falls into the scope of the present invention.

As previously mentioned, since the intensity variation of the reflected light signal RL is periodic, the optical detection module 15 can convert the reflected light signal RL to an electronic signal with periodic characteristics. For example, when the rotating rate of the housing 12 is fixed, the optical detection module 15 can output the first pulse width modulation signal with a fixed frequency. However, after the projector 100 is operated for a long time, an amount of dust inside the housing 12 will increase. When a lot of dust is accumulated on the housing 12, a gray level difference between an area of the timing mark TIM and an area of the housing 12 outside the timing mark TIM is reduced. As a result, the intensity variation of the reflected light signal RL is also reduced. When the intensity variation of the reflected light signal RL is reduced, an amplitude of the first pulse width modulation signal outputted from the optical detection module 15 is also reduced. Therefore, in order to avoid rapidly reducing the amplitude of the first pulse width modulation signal, the projector 100 can use the feedback module 16 coupled to the optical detection module 15 for conditionally outputting an adjusted voltage to the optical detection module 15 according to the first pulse width modulation signal. The adjusted voltage can be received by the optical detection module 15 for enhancing an optical detection capability of the optical detection module 15. In the projector 100, when the amplitude of the first pulse width modulation signal is smaller than a threshold (say, "a second predetermined value" hereafter), the motor 13 ceases rotating the color wheel 11. Since the projector 100 can use the feedback module 16 for enhancing the optical detection capability of the optical detection module 15 by increasing the amplitude of the first pulse width modulation signal, the projector 100 can increase its working time under a dusty environment. The projector 100 can further include a light pipe module 18 and a digital micro-mirror device 17. The light pipe module 18 can be disposed between the light source 10 and the color wheel 11 for optically conducting the light beam to the color wheel 11. The digital micro-mirror device 17 can be used for reflecting the light with the plurality of colors to the lens module 14. In the following, circuit structures of the optical detection module 15 and the feedback module 16 of the projector 100, and a method for increasing working time of the projector 100 under the dusty environment are illustrated.

Figure 2:
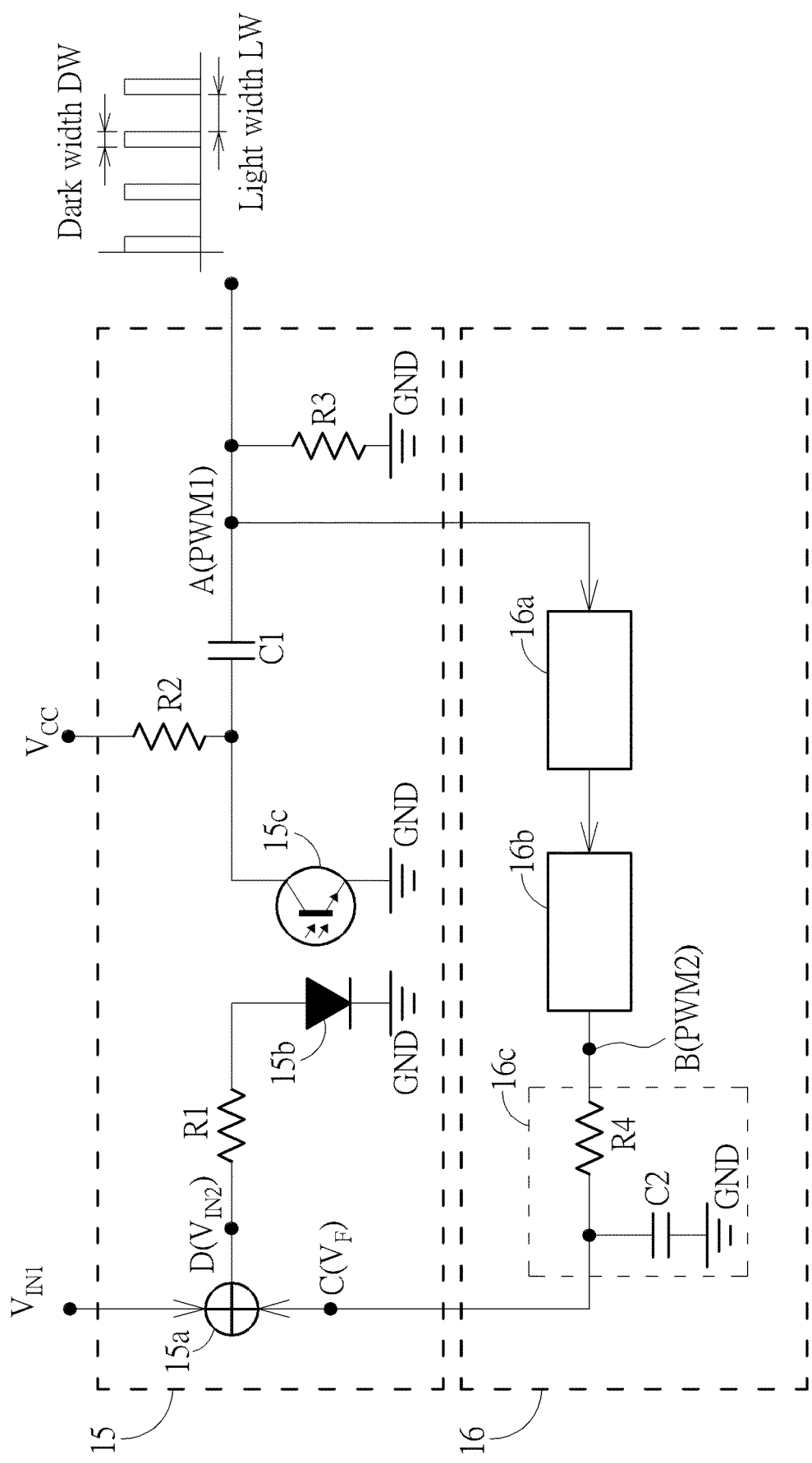
FIG. 2 is circuit structures of an optical detection module and a feedback module of the projector in FIG. 1.

FIG. 2 is circuit structures of the optical detection module 15 and the feedback module 16 of the projector 100. The optical detection module 15 includes an adder 15a, a first resistor R1, a light-emitting diode 15b, a phototransistor 15c, a second resistor R2, a first capacitor C1, and a third resistor R3. The adder 15a includes a first input terminal for receiving the first driving voltage $V_{IN1}$, a second input terminal for receiving the adjusted voltage $V_F$, and an output terminal for outputting a second driving voltage $V_{IN2}$. Here, the second driving voltage $V_{IN2}$ can be generated by linearly combining the first driving voltage $V_{IN1}$ with the adjusted voltage $V_F$, such as $V_{IN2}=V_{IN1}+V_F$. As shown in FIG. 2, the second input terminal of the adder 15a is denoted as "C". The adjusted voltage $V_F$ inputted to the second input terminal C is denoted as "C ($V_F$)". The output terminal of the adder 15a is denoted as "D". The second driving voltage $V_{IN2}$ outputted from the output terminal D is denoted as "D ($V_{IN2}$)". In other words, the second input terminal C and the output terminal D can be regarded as two nodes with different voltages ($V_F$ and $V_{IN2}$) The first resistor R1 includes a first terminal coupled to the output terminal D of the adder 15a, and a second terminal. The light-emitting diode 15b includes an anode coupled to the second terminal of the first resistor R1, and a cathode coupled to a ground terminal GND. The phototransistor 15c includes a third terminal, a light control terminal, and a fourth terminal coupled to the ground terminal GND. The light control terminal is used for controlling impedance of the phototransistor 15c according to an intensity of a light signal. The second resistor R2 includes a fifth terminal for receiving a high voltage $V_{CC}$, and a sixth terminal coupled to the third terminal of the phototransistor 15c. The first capacitor C1 includes a seventh terminal coupled to the sixth terminal of the second resistor R2, and an eighth terminal for outputting the first pulse width modulation signal PWM1, as A(PWN1) at node A. The third resistor R3 includes a ninth terminal coupled to the eighth terminal of the first capacitor C1, and a tenth terminal coupled to the ground terminal GND. When the housing 12 is rotated, the light-emitting diode 15b emits the detection light signal DL to the housing 12, the housing 12 reflects the detection light signal DL and generates the reflected light signal RL to the phototransistor 15c. Since the intensity variation of the reflected light signal RL is periodic, the phototransistor 15c can change the impedance periodically according to the intensity of the reflected light signal RL. In other words, a current passing through the phototransistor 15c can be varied according to the intensity variation of the reflected light signal RL. Here, the second resistor R2 and the phototransistor 15c can form a voltage divider between a terminal of the high voltage $V_{CC}$ and the ground terminal GND. The first pulse width modulation signal PWM1 is outputted from the first capacitor C1 through the voltage divider formed by the phototransistor 15c and the second resistor R2. The first resistor R1 can be used for controlling the first driving voltage $V_{IN1}$ and the second driving voltage $V_{IN2}$ to drive the phototransistor 15b within a linear operation region. Therefore, the operational efficiency of the phototransistor 15b can be optimized. Further, the third resistor R3 can provide a predetermined resistance for adjusting a waveform of the first pulse width modulation signal PWM1 within an operational region of a processor chip (i.e., a scaler IC). Therefore, the motor 13 can be accurately controlled according to the first pulse width modulation signal PWM1.

As previously mentioned, the timing mark TIM has the first gray level. The area of the housing 12 outside the timing mark TIM has the second gray level. The first gray level is smaller than the second gray level. Therefore, when the detection light signal DL is emitted to the timing mark TIM having a dark color tone, the intensity of the reflected light signal RL is weak. The phototransistor 15c is operated on an open-state when the phototransistor 15c receives the "weak" reflected light signal RL. Then, the first capacitor C1 is charged by the high voltage Vcc. A voltage of node A becomes a high voltage. When the detection light signal DL is emitted to the housing 12 outside the timing mark TIM, the intensity of the reflected light signal RL is strong. The phototransistor 15c is operated on a short-state when the phototransistor 15c receives the "strong" reflected light signal RL. Then, a power leakage path is generated from the first capacitor C1 to the ground terminal GND through the phototransistor 15c. Therefore, a voltage of node A becomes a low voltage. Therefore, for the first pulse width modulation signal PWM1 outputted from the optical detection module 15, a light width LW corresponds to the detection light signal DL reflected by the housing 12 outside the timing mark TIM. A dark width DW corresponds to the detection light signal DL reflected by the timing mark TIM. The light width LW can be greater than the dark width DW.

The feedback module 16 includes a pulse level detection module 16a, a processor 16b, and a low-pass filter 16c. The pulse level detection module 16a is coupled to the eighth terminal of the first capacitor C1 for receiving the first pulse width modulation signal PWM1 and generating a detection result signal according to the first pulse width modulation signal PWM1. Here, when the amplitude of the first pulse width modulation signal PWM1 is smaller than a first predetermined value, the detection result signal outputted from the pulse level detection module 16a is at a first voltage level. When the amplitude of the first pulse width modulation signal PWM1 is greater than or equal to the first predetermined value, the detection result signal outputted from the pulse level detection module 16a is at a second voltage level. In other words, the first predetermined value can be regarded as a threshold of triggering the feedback module 16 to increase the adjusted voltage $V_F$. For example, the first predetermined value can be set as 80% of original amplitude of the first pulse width modulation signal PWM1. When the projector 100 has a lot of dust on the housing 12, the amplitude of the first pulse width modulation signal PWM1 is smaller than 80% of original amplitude. Then, the pulse level detection module 16a can output a detection result signal with a high voltage level (i.e., H: Dust Mask). It implies that a lot of dust is detected on the housing 12. When the projector 100 has only a little dust on the housing 12, the amplitude of the first pulse width modulation signal PWM1 is greater than 80% of original amplitude (i.e., 80%-100%). Then, the pulse level detection module 16a can output a detection result signal with a low voltage level (i.e., L: Normal). The processor 16b is coupled to the pulse level detection module 16a for receiving the detection result signal and generating an output signal according to the detection result signal. The processor 16b can be a microprocessor or any logical hardware. The output signal of the processor 16b can be a second pulse width modulation signal PWM2 with an adjustable duty cycle. For example, the processor 16b can output the second pulse width modulation signal PWM2 with a first duty cycle Q % during a first time interval. The processor 16b can adjust the first duty cycle Q % of the second pulse width modulation signal PWM2 to a second duty cycle (Q+5) % when the detection result signal received by the processor is at the first voltage level (i.e., H: Dust Mask) during a second time interval. Here, the second duty cycle (Q+5) % is greater than the first duty cycle Q %. However, an increment of the first duty cycle is not limited to 5%. The first time interval is followed by the second time interval. In other words, when the projector 100 has a lot of dust on its housing 12, the processor 16b can increase the duty cycle of the second pulse width modulation signal PWM2 for increasing the adjusted voltage $V_F$ by the feedback module 16. When the adjusted voltage $V_F$ is increased, the second driving voltage $V_{IN2}=V_{IN1}+V_F$ is also increased. Therefore, the brightness of the light-emitting diode 15b can be increased for increasing the amplitude of the first pulse width modulation signal PWM1 outputted form the optical detection module 15. In other words, the light-emitting diode 15b uses the first driving voltage $V_{IN1}$ for generating a first detection light signal. The light-emitting diode 15b uses the second driving voltage $V_{IN2}$ for generating a second detection light signal. The brightness of the second detection light signal is greater than the brightness of the first detection light signal. A purpose of previous process is to drive the light-emitting diode 15b for emitting a brighter detection light. By doing so, since the phototransistor 15c can receive the reflected light signal RL with large energy, decay of the amplitude of the first pulse width modulation signal PWM1 can be mitigated. Since the decay of the amplitude of the first pulse width modulation signal PWM1 can be mitigated, the working time of the projector 100 under the dusty environment can be increased. In another operational mode, the processor 16b can output the second pulse width modulation signal PWM2 with the first duty cycle Q % during the first time interval. The processor 16b maintains the first duty cycle Q % of the second pulse width modulation signal PWM2 when the detection result signal received by the processor 16b is at the second voltage level (i.e., L: Normal) during the second time interval. Q is a non-negative integer. In other words, when an amount of the dust on the housing 16 is detected within a tolerable range, the adjusted voltage $V_F$ of the feedback module 16 does not need to be increased.

Further, the feedback module 16 can use the low-pass filter 16c to convert the second pulse width modulation signal PWM2 (i.e., at node B) outputted from the processor 16b to the adjusted voltage $V_F$. The low-pass filter 16c can be coupled to the processor 16b and the second input terminal of the adder 15a for generating the adjusted voltage $V_F$ according to the second pulse width modulation signal PWM2. Here, when the duty cycle of the second pulse width modulation signal PWM2 is increased, the adjusted voltage $V_F$ outputted from the low-pass filter 16c is also increased. When the duty cycle of the second pulse width modulation signal PWM2 is decreased, the adjusted voltage $V_F$ outputted from the low-pass filter 16c is also decreased. The low-pass filter 16c can include a fourth resistor R4 and a second capacitor C2. The fourth resistor R4 can include an eleventh terminal coupled to the second input terminal of the adder 15a, and a twelfth terminal coupled to the processor 16b for receiving the second pulse width modulation signal PWM2. The second capacitor C2 includes a thirteenth terminal coupled to the eleventh terminal of the fourth resistor R4 for outputting the adjusted voltage $V_F$, and a fourteenth terminal coupled to the ground terminal GND. The low-pass filter 16c can filter out an AC (Alternating Current) component of the pulse width modulation signal PWM2 and can retain a DC (Direct Current) component of the pulse width modulation signal PWM2 for generating the adjusted voltage $V_F$. Further, when the duty cycle of the second pulse width modulation signal PWM2 is large, it implies that energy of the second pulse width modulation signal PWM2 is large. Therefore, the adjusted voltage $V_F$ generated by filtering out the DC component of the second pulse width modulation signal PWM2 is large. On the contrary, when the duty cycle of the second pulse width modulation signal PWM2 is small, it implies that energy of the second pulse width modulation signal PWM2 is small. Therefore, the adjusted voltage $V_F$ generated by filtering out the DC component of the second pulse width modulation signal PWM2 is small.

In FIG. 2, the output terminal of the adder 15a is used for outputting the second driving voltage $V_{IN2}$. The second driving voltage $V_{IN2}$ is generated by linearly combining the first driving voltage $V_{IN1}$ with the adjusted voltage $V_F$, such as $V_{IN2}=V_{IN1}+V_F$. However, any reasonable linearly combining method for generating the adjusted voltage $V_F$ falls into the scope of the present invention. For example, the second driving voltage $V_{IN2}$ can be written by $\alpha \times V_{IN1}+\beta \times V_F$. $\alpha$ and $\beta$ are two weighting values greater than zero. When the amplitude of the first pulse width modulation signal PWM1 is smaller than the first predetermined value, the feedback module 16 increases the adjusted voltage $V_F$ to make the second driving voltage $V_{IN2}$ greater than the first driving voltage $V_{IN1}$. However, the light-emitting diode 15b has a brightness limit. In other words, the light-emitting diode 15b cannot provide a detection light signal DL with infinite energy intensity. Therefore, the adjusted voltage $V_F$ has an upper-bound. The upper-bound of the adjusted voltage $V_F$ corresponds to maximum brightness supported by the light-emitting diode 15b. Since the adjusted voltage $V_F$ has the upper-bound, a duty cycle of the second pulse width modulation signal PWM2 has an upper-bound. In other words, when the first duty cycle of the second pulse width modulation signal PWM2 is adjusted to the second duty cycle to reach the upper-bound, the processor 16b cannot increase the second duty cycle of the second pulse width modulation signal PWM2 anymore, regardless of the severity of the dust. In other words, the second duty cycle is smaller than a maximum duty cycle. By doing so, the light-emitting diode 15b can be protected from power damage by the high voltage. In other words, after the projector 100 is operated under the dusty environment, the optical detection module 15 can gradually increase the brightness of the light-emitting diode 15b for mitigating the decay of the amplitude of the first pulse width modulation signal PWM1. However, after a long period of use, when the brightness of the light-emitting diode 15b reaches the upper-bound but the amplitude of the first pulse modulation signal PWN1 is still severely distorted due to the great amount of dust, eventually, the motor 13 ceases rotating the color wheel 11.

Figure 3:
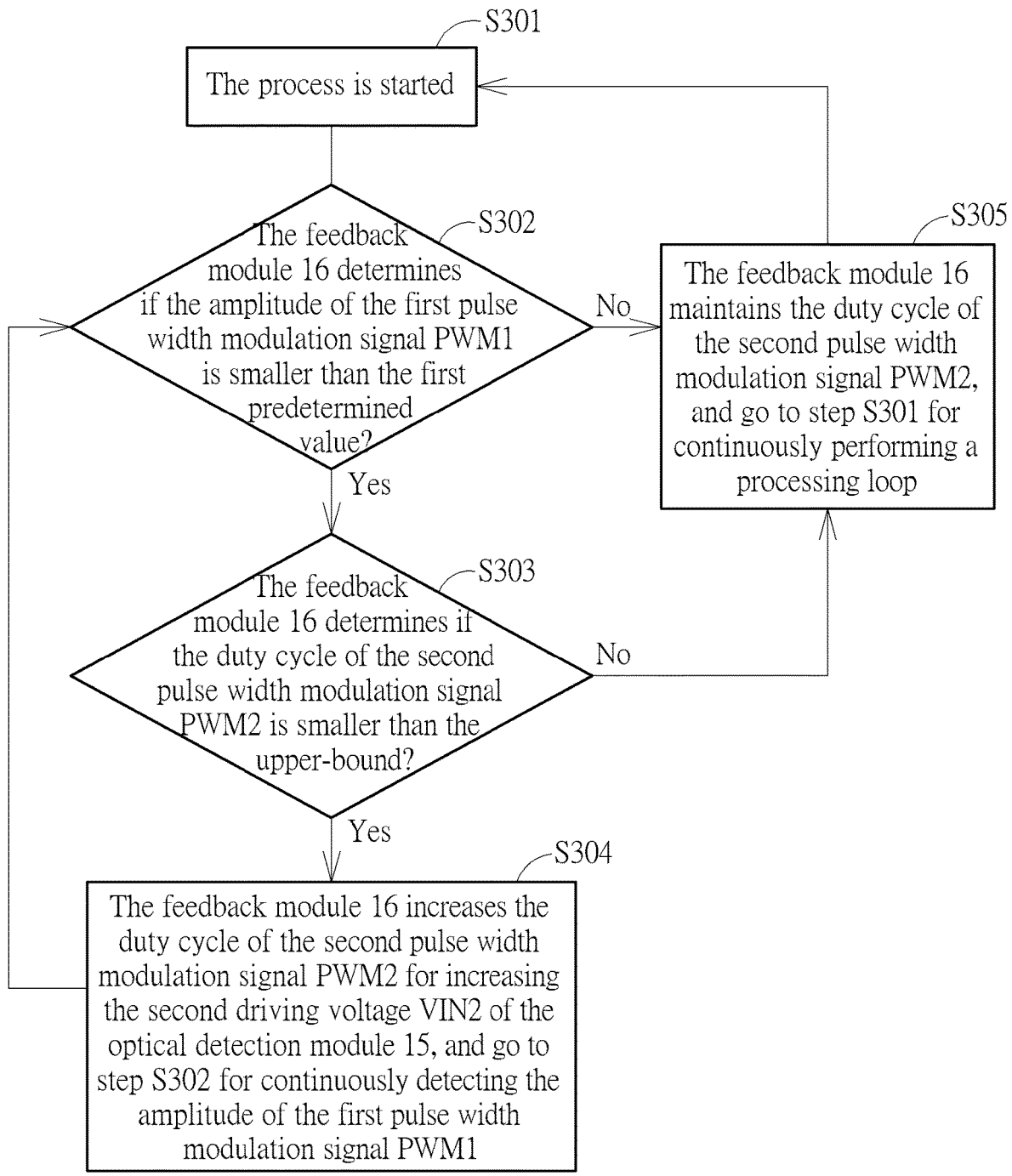
FIG. 3 is a flow chart of adjusting a second driving voltage of the optical detection module by using a feedback module for increasing working time duration of the projector in FIG. 1 under a dusty environment.

FIG. 3 is a flow chart of adjusting the second driving voltage $V_{IN2}$ of the optical detection module 15 by using the feedback module 16 for increasing working time of the projector 100 under the dusty environment. A method for increasing working time duration of the projector 100 includes step S301 to step S305. Any reasonable technology modification falls into the scope of the present invention. Step S301 to step S305 are illustrated below.

step S301: the process is started;

step S302: the feedback module 16 determines if the amplitude of the first pulse width modulation signal PWM1 is smaller than the first predetermined value? if the amplitude is smaller than the first predetermined value, go to step S303, if the amplitude is greater than or equal to the first predetermined value, go to step S305;

step S303: the feedback module 16 determines if the duty cycle of the second pulse width modulation signal PWM2 is smaller than the upper-bound? if the duty cycle is smaller than the upper-bound, go to step S304, if the duty cycle reaches the upper-bound, go to step S305;

step S304: the feedback module 16 increases the duty cycle of the second pulse width modulation signal PWM2 for increasing the second driving voltage $V_{IN2}$ of the optical detection module 15, and go to step S302 for continuously detecting the amplitude of the first pulse width modulation signal PWM1;

step S305: the feedback module 16 maintains the duty cycle of the second pulse width modulation signal PWM2, and go to step S301 for continuously performing a processing loop.

Details of step S301 to step S305 are previously illustrated. Thus, they are omitted here. A practical example is introduced for illustrating the method for increasing working time of the projector 100. Initially, the projector 100 operating under the dusty environment is ready to start a dust resistance process in step S301. Since only a little dust is detected on the housing 12, the feedback module 16 detects that the amplitude of the first pulse width modulation signal PWM1 is greater than the first predetermined value in step S302. Therefore, in step S305, the feedback module 16 maintains the duty cycle of the second pulse width modulation signal PWM2 (i.e., substantially equal to 0%) and go to step S301. However, the amount of dust is increased over time. When a lot of dust is detected on the housing 12, the feedback module 16 detects that the amplitude of the first pulse width modulation signal PWM1 is smaller than the first predetermined value in step S302. Then, the feedback module 16 increases the duty cycle of the second pulse width modulation signal PWM2 for increasing the second driving voltage $V_{IN2}$ in order to mitigate the decay of the amplitude of the first pulse width modulation signal PWM1. However, after a long period of operation, the feedback module 16 detects that the duty cycle of the second pulse width modulation signal PWM2 reaches the upper-bound in step S303. Therefore, according to step S305, the feedback module 16 maintains the duty cycle of the second pulse width modulation signal PWM2 (i.e., maximum duty cycle). Since the duty cycle of the second pulse width modulation signal PWM2 reaches the upper-bound, it is unavoidable that the amplitude of the first pulse width modulation signal PWM1 is decayed over time. Therefore, after step S305, when the amplitude of the first pulse width modulation signal PWM1 is smaller than the second predetermined value, the projector 100 can cease all operations. Therefore, the projector 100 is capable of performing long term operations under the dusty environment. However, when too much dust is detected on the housing 12, in order to protect circuit components of the projector 100, the projector 100 can cease all operations.

To sum up, the present invention discloses a projector with a dust resistance capability for long term operations. The projector uses a feedback module for conditionally outputting an adjusted voltage to an optical detection module in order to enhance optical detection capability of the optical detection module, thereby mitigating the decay of the pulse width modulation signal. When only a little dust is detected, a light-emitting diode of the optical detection module can increase brightness of a detection light signal by using the adjusted voltage. Since the projector can be operated under the dusty environment for a long time, operational convenience can be increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector comprising:
a light source configured to emit a light beam;
a color wheel comprising a plurality of optical filtering segments configured to generate light with a plurality of colors when the light beam passes through the plurality of optical filtering segments;
a housing connected to the color wheel and having a timing mark, the timing mark having a first gray level, an area of the housing outside the timing mark having a second gray level;
a motor connected to the housing and configured to rotate the color wheel through the housing;
a lens module configured to output the light with the plurality of colors; and
an optical detection module facing the housing and configured to receive a first driving voltage for generating a first pulse width modulation signal according to the first gray level and the second gray level alternatively displayed on a detecting region when the housing is rotated; and
a feedback module coupled to the optical detection module and configured to conditionally output an adjusted voltage to the optical detection module according to the first pulse width modulation signal;
wherein the first gray level is smaller than the second gray level.

2. The projector of claim 1, wherein the optical detection module comprises:
an adder comprising:
a first input terminal configured to receive the first driving voltage;
a second input terminal configured to receive the adjusted voltage; and
an output terminal;
a first resistor comprising:
a first terminal coupled to the output terminal of the adder; and
a second terminal;
a light-emitting diode comprising:
an anode coupled to the second terminal of the first resistor; and
a cathode coupled to a ground terminal;
a phototransistor comprising:
a third terminal;
a light control terminal configured to control impedance of the phototransistor according to an intensity of a light signal; and
a fourth terminal coupled to the ground terminal;
a second resistor comprising:
a fifth terminal configure to receive a high voltage; and
a sixth terminal coupled to the third terminal of the phototransistor;
a first capacitor comprising:
a seventh terminal coupled to the sixth terminal of the second resistor; and
an eighth terminal configured to output the first pulse width modulation signal; and
a third resistor comprising:
a ninth terminal coupled to the eighth terminal of the first capacitor; and
a tenth terminal coupled to the ground terminal.

3. The projector of claim 2, wherein when the housing is rotated, the light-emitting diode emits a detection light signal to the housing, the housing reflects the detection light signal and generates a reflected light signal to the phototransistor, the phototransistor changes the impedance according to an intensity of the reflected light signal, and the first pulse width modulation signal is outputted from the first capacitor through a voltage divider formed by the phototransistor and the second resistor.

4. The projector of claim 2, wherein the output terminal of the adder is configured to output a second driving voltage, the second driving voltage is generated by linearly combining the first driving voltage with the adjusted voltage, when an amplitude of the first pulse width modulation signal is smaller than a first predetermined value, the feedback module increases the adjusted voltage to make the second driving voltage greater than the first driving voltage.

5. The projector of claim 4, wherein the light-emitting diode uses the first driving voltage for generating a first detection light signal, the light-emitting diode uses the second driving voltage for generating a second detection light signal, and brightness of the second detection light signal is greater than brightness of the first detection light signal.

6. The projector of claim 2, wherein the feedback module comprises:

a pulse level detection module coupled to the eighth terminal of the first capacitor and configured to receive the first pulse width modulation signal for generating a detection result signal according to the first pulse width modulation signal;

a processor coupled to the pulse level detection module and configured to receive the detection result signal and generate an output signal according to the detection result signal; and a low-pass filter coupled to the processor and the second input terminal of the adder and configured to generate the adjusted voltage according to the output signal;

wherein when an amplitude of the first pulse width modulation signal is smaller than a first predetermined value, the detection result signal outputted from the pulse level detection module is at a first voltage level, and when the amplitude of the first pulse width modulation signal is greater than or equal to the first predetermined value, the detection result signal outputted from the pulse level detection module is at a second voltage level.

7. The projector of claim 6, wherein the processor outputs a second pulse width modulation signal with a first duty cycle during a first time interval, the processor adjusts the first duty cycle of the second pulse width modulation signal to a second duty cycle when the detection result signal received by the processor is at the first voltage level during a second time interval, the second duty cycle is greater than the first duty cycle, the first time interval is followed by the second time interval, and the second duty cycle is smaller than a maximum duty cycle.

8. The projector of claim 6, wherein the processor outputs a second pulse width modulation signal with a first duty cycle during a first time interval, the processor maintains the first duty cycle of the second pulse width modulation signal when the detection result signal received by the processor is at the second voltage level during a second time interval, and the first time interval is followed by the second time interval.

9. The projector of claim 6, wherein the low-pass filter comprises:
 a fourth resistor comprising:
  an eleventh terminal coupled to the second input terminal of the adder; and
  a twelfth terminal coupled to the processor and configured to receive the output signal; and
 a second capacitor comprising:
  a thirteenth terminal coupled to the eleventh terminal of the fourth resistor and configured to output the adjusted voltage; and
  a fourteenth terminal coupled to the ground terminal.

10. The projector of claim 1, further comprising:
 a light pipe module disposed between the light source and the color wheel and configured to optically conduct the light beam to the color wheel; and
 a digital micro-mirror device configured to reflect the light with the plurality of colors to the lens module.

11. The projector of claim 1, wherein when an amplitude of the first pulse width modulation signal is smaller than a second predetermined value, the motor ceases rotating the color wheel.

* * * * *